US008738051B2

(12) United States Patent
Nowack et al.

(10) Patent No.: US 8,738,051 B2
(45) Date of Patent: May 27, 2014

(54) METHOD AND SYSTEM FOR CONTROLLING MESSAGE ROUTING

(71) Applicant: Twilio, Inc., San Francisco, CA (US)

(72) Inventors: Matthew David Nowack, San Bruno, CA (US); Patrick Malatack, San Francisco, CA (US); Thomas Wilsher, San Francisco, CA (US); Chad Selph, San Francisco, CA (US)

(73) Assignee: Twilio, Inc., San Franciso, CA (US)

( * ) Notice: Subject to any disclaimer, the term of this patent is extended or adjusted under 35 U.S.C. 154(b) by 0 days.

(21) Appl. No.: 13/951,349

(22) Filed: Jul. 25, 2013

(65) Prior Publication Data

US 2014/0031070 A1 Jan. 30, 2014

Related U.S. Application Data

(60) Provisional application No. 61/751,773, filed on Jan. 11, 2013, provisional application No. 61/676,261, filed on Jul. 26, 2012.

(51) Int. Cl.
*H04W 4/14* (2009.01)

(52) U.S. Cl.
USPC ...... 455/466; 455/428; 455/435.2; 455/435.3

(58) Field of Classification Search
USPC ............ 455/412.1–2, 414.1, 434, 435.2, 445, 455/466, 435.3, 103, 428, 3.01, 3.04, 703
See application file for complete search history.

(56) References Cited

U.S. PATENT DOCUMENTS

| | | | |
|---|---|---|---|
| 5,274,700 | A | 12/1993 | Gechter et al. |
| 5,526,416 | A | 6/1996 | Dezonno et al. |
| 5,581,608 | A | 12/1996 | Jreij et al. |
| 5,598,457 | A | 1/1997 | Foladare et al. |
| 6,094,681 | A | 7/2000 | Shaffer et al. |
| 6,138,143 | A | 10/2000 | Gigliotti et al. |
| 6,185,565 | B1 | 2/2001 | Meubus et al. |
| 6,192,123 | B1 | 2/2001 | Grunsted et al. |
| 6,223,287 | B1 | 4/2001 | Douglas et al. |
| 6,269,336 | B1 | 7/2001 | Ladd et al. |

(Continued)

FOREIGN PATENT DOCUMENTS

| | | | |
|---|---|---|---|
| DE | 1684587 | A | 3/1971 |
| EP | 0282126 | A | 9/1988 |

(Continued)

OTHER PUBLICATIONS

Complaint for Patent Infringement, *Telinit Technologies, LLC* v. *Twilio Inc.*, dated Oct. 12, 2012.

*Primary Examiner* — Cong Tran
(74) *Attorney, Agent, or Firm* — Jeffrey Schox; Brian Van Osdol

(57) ABSTRACT

A system and method for transmitting telephony messages that includes transmitting a first outgoing telephony message through a first channel using a first routing option selected from a plurality of routing options; receiving a message delivery report through at least a second channel; updating message routing data in response to the message delivery report; selecting a second routing option for at least a second outgoing message, the second routing option selected from the plurality of routing options prioritized by the updated message routing data; and transmitting a second outgoing telephony message through the first channel using the selected second routing option.

23 Claims, 15 Drawing Sheets

S110
Sending a first outgoing message through a first channel using a first routing option selected from a plurality of routing options S120
Receiving a message delivery report through at least a second channel S130
Updating message routing data with the message delivery report S140
Selecting a second routing option for a second outgoing message, the routing option selected from a plurality of routing options according to an optimality assessment of message routing data

(56) References Cited

U.S. PATENT DOCUMENTS 6,425,012 B1 7/2002 Trovato et al.
6,430,175 B1 8/2002 Echols et al.
6,434,528 B1 8/2002 Sanders
6,445,694 B1 9/2002 Swartz
6,445,776 B1 9/2002 Shank et al.
6,459,913 B2 10/2002 Cloutier
6,493,558 B1 12/2002 Bernhart et al.
6,496,500 B2 12/2002 Johnson et al.
6,501,832 B1 12/2002 Saylor et al.
6,507,875 B1 1/2003 Mellen-Garnett et al.
6,600,736 B1 7/2003 Ball et al.
6,606,596 B1 8/2003 Zirngibl et al.
6,614,783 B1 9/2003 Sonesh et al.
6,625,258 B1 9/2003 Ram et al.
6,625,576 B2 9/2003 Kochanski et al.
6,662,231 B1 12/2003 Drosset et al.
6,704,785 B1 3/2004 Koo et al.
6,707,889 B1 3/2004 Saylor et al.
6,711,249 B2 3/2004 Weissman et al.
6,738,738 B2 5/2004 Henton
6,757,365 B1 6/2004 Bogard
6,765,997 B1 7/2004 Zirngibl et al.
6,768,788 B1 7/2004 Langseth et al.
6,778,653 B1 8/2004 Kallas et al.
6,785,266 B2 8/2004 Swartz
6,788,768 B1 9/2004 Saylor et al.
6,792,086 B1 9/2004 Saylor et al.
6,798,867 B1 9/2004 Zirngibl et al.
6,807,529 B2 10/2004 Johnson et al.
6,807,574 B1 10/2004 Partovi et al.
6,819,667 B1 11/2004 Brusilovsky et al.
6,829,334 B1 12/2004 Zirngibl et al.
6,834,265 B2 12/2004 Balasuriya
6,836,537 B1 12/2004 Zirngibl et al.
6,842,767 B1 1/2005 Partovi et al.
6,850,603 B1 2/2005 Eberle et al.
6,870,830 B1 * 3/2005 Schuster et al. .............. 370/352
6,873,952 B1 3/2005 Bailey et al.
6,874,084 B1 3/2005 Dobner et al.
6,885,737 B1 4/2005 Gao et al.
6,888,929 B1 5/2005 Saylor et al.
6,895,084 B1 5/2005 Saylor et al.
6,898,567 B2 5/2005 Balasuriya
6,912,581 B2 6/2005 Johnson et al.
6,922,411 B1 7/2005 Taylor
6,931,405 B2 8/2005 El-Shimi et al.
6,937,699 B1 8/2005 Schuster et al.
6,940,953 B1 9/2005 Eberle et al.
6,941,268 B2 9/2005 Porter et al.
6,947,417 B2 9/2005 Laursen et al.
6,961,330 B1 11/2005 Cattan et al.
6,964,012 B1 11/2005 Zirngibl et al.
6,970,915 B1 11/2005 Partovi et al.
6,977,992 B2 12/2005 Zirngibl et al.
6,985,862 B2 1/2006 Stroem et al.
7,003,464 B2 2/2006 Ferrans et al.
7,006,606 B1 2/2006 Cohen et al.
7,010,586 B1 3/2006 Allavarpu et al.
7,020,685 B1 3/2006 Chen et al.
7,039,165 B1 5/2006 Saylor et al.
7,062,709 B2 6/2006 Cheung
7,076,428 B2 7/2006 Anastasakos et al.
7,089,310 B1 8/2006 Ellerman et al.
7,103,003 B2 9/2006 Brueckheimer et al.
7,103,171 B1 9/2006 Annadata et al.
7,111,163 B1 9/2006 Haney
7,140,004 B1 11/2006 Kunins et al.
7,143,039 B1 11/2006 Stifelman et al.
7,197,331 B2 3/2007 Anastasakos et al.
7,197,461 B1 3/2007 Eberle et al.
7,197,462 B2 3/2007 Takagi et al.
7,197,544 B2 3/2007 Wang et al.
7,225,232 B2 5/2007 Elberse
7,227,849 B1 6/2007 Raesaenen
7,266,181 B1 9/2007 Zirngibl et al.
7,269,557 B1 9/2007 Bailey et al.
7,272,212 B2 9/2007 Eberle et al.
7,272,564 B2 9/2007 Phillips et al.
7,277,851 B1 10/2007 Henton
7,283,515 B2 10/2007 Fowler
7,286,521 B1 10/2007 Jackson et al.
7,287,248 B1 10/2007 Adeeb
7,289,453 B2 10/2007 Riedel et al.
7,298,732 B2 11/2007 Cho
7,308,085 B2 12/2007 Weissman
7,308,408 B1 12/2007 Stifelman et al.
7,324,633 B2 1/2008 Gao et al.
7,324,942 B1 1/2008 Mahowald et al.
7,330,890 B1 2/2008 Partovi et al.
7,340,040 B1 3/2008 Saylor et al.
7,349,714 B2 * 3/2008 Lee et al. ...................... 455/522
7,369,865 B2 5/2008 Gabriel et al.
7,376,223 B2 5/2008 Taylor et al.
7,376,586 B1 5/2008 Partovi et al.
7,376,740 B1 5/2008 Porter et al.
7,412,525 B2 8/2008 Cafarella et al.
7,428,302 B2 9/2008 Zirngibl et al.
7,440,898 B1 10/2008 Eberle et al.
7,447,299 B1 11/2008 Partovi et al.
7,454,459 B1 11/2008 Kapoor et al.
7,457,397 B1 11/2008 Saylor et al.
7,486,780 B2 2/2009 Zirngibl et al.
7,496,054 B2 2/2009 Taylor
7,500,249 B2 3/2009 Kampe et al.
7,505,951 B2 3/2009 Thompson et al.
7,519,359 B2 4/2009 Chiarulli et al.
7,522,711 B1 4/2009 Stein et al.
7,536,454 B2 5/2009 Balasuriya
7,552,054 B1 6/2009 Stifelman et al.
7,571,226 B1 8/2009 Partovi et al.
7,613,287 B1 11/2009 Stifelman et al.
7,623,648 B1 11/2009 Oppenheim et al.
7,630,900 B1 12/2009 Strom
7,631,310 B1 12/2009 Henzinger
7,644,000 B1 1/2010 Strom
7,657,433 B1 2/2010 Chang
7,657,434 B2 2/2010 Thompson et al.
7,672,295 B1 3/2010 Andhare et al.
7,675,857 B1 3/2010 Chesson
7,882,253 B2 2/2011 Pardo-Castellote et al.
7,920,866 B2 * 4/2011 Bosch et al. .................. 455/436
7,926,099 B1 4/2011 Chakravarty et al.
7,936,867 B1 5/2011 Hill et al.
7,962,644 B1 6/2011 Ezerzer et al.
8,081,958 B2 12/2011 Soederstroem et al.
8,103,725 B2 1/2012 Gupta et al.
8,126,128 B1 2/2012 Hicks, III et al.
8,150,918 B1 4/2012 Edelman et al.
8,266,327 B2 9/2012 Kumar et al.
2002/0006124 A1 1/2002 Jimenez et al.
2002/0006125 A1 * 1/2002 Josse et al. .................... 370/354
2002/0006193 A1 1/2002 Rodenbusch et al.
2002/0077833 A1 6/2002 Arons et al.
2002/0126813 A1 9/2002 Partovi et al.
2003/0006137 A1 1/2003 Wei et al.
2003/0018830 A1 1/2003 Chen et al.
2003/0026426 A1 2/2003 Wright et al.
2003/0046366 A1 3/2003 Pardikar et al.
2003/0051037 A1 3/2003 Sundaram et al.
2003/0059020 A1 3/2003 Meyerson et al.
2003/0061404 A1 3/2003 Atwal et al.
2003/0088421 A1 5/2003 Maes et al.
2003/0123640 A1 7/2003 Roelle et al.
2003/0211842 A1 11/2003 Kempf et al.
2003/0231647 A1 12/2003 Petrovykh
2004/0071275 A1 4/2004 Bowater et al.
2004/0101122 A1 5/2004 Da Palma et al.
2004/0172482 A1 9/2004 Weissman et al.
2004/0213400 A1 10/2004 Golitsin et al.
2005/0010483 A1 1/2005 Ling
2005/0025303 A1 2/2005 Hostetler
2005/0038772 A1 2/2005 Colrain
2005/0135578 A1 6/2005 Ress et al.
2005/0177635 A1 8/2005 Schmidt et al.

(56) References Cited

U.S. PATENT DOCUMENTS

2005/0240659 A1 10/2005 Taylor
2005/0243977 A1 11/2005 Creamer et al.
2005/0246176 A1 11/2005 Creamer et al.
2006/0015467 A1 1/2006 Morken et al.
2006/0047666 A1 3/2006 Bedi et al.
2006/0067506 A1 3/2006 Flockhart et al.
2006/0143007 A1 6/2006 Koh et al.
2006/0168334 A1 7/2006 Potti et al.
2006/0203979 A1 9/2006 Jennings
2006/0209695 A1 9/2006 Archer et al.
2006/0215824 A1 9/2006 Mitby et al.
2006/0217823 A1 9/2006 Hussey
2006/0217978 A1 9/2006 Mitby et al.
2006/0256816 A1 11/2006 Yarlagadda et al.
2006/0262915 A1 11/2006 Marascio et al.
2006/0285489 A1 12/2006 Francisco et al.
2007/0002744 A1 1/2007 Mewhinney et al.
2007/0036143 A1 2/2007 Alt et al.
2007/0050306 A1 3/2007 Mcqueen
2007/0070906 A1 3/2007 Thakur
2007/0070980 A1 3/2007 Phelps et al.
2007/0071223 A1 3/2007 Lee et al.
2007/0074174 A1 3/2007 Thornton
2007/0121651 A1 5/2007 Casey et al.
2007/0127691 A1 6/2007 Lert
2007/0127703 A1 6/2007 Siminoff
2007/0130260 A1 6/2007 Weintraub et al.
2007/0133771 A1 6/2007 Stifelman et al.
2007/0153711 A1 7/2007 Dykas et al.
2007/0192629 A1 8/2007 Saito
2007/0208862 A1 9/2007 Fox et al.
2007/0242626 A1 10/2007 Altberg et al.
2007/0265073 A1 11/2007 Novi et al.
2007/0286180 A1 12/2007 Marquette et al.
2007/0291905 A1 12/2007 Halliday et al.
2008/0040484 A1 2/2008 Yardley
2008/0091843 A1 4/2008 Kulkarni
2008/0104348 A1 5/2008 Kabzinski et al.
2008/0134049 A1 6/2008 Gupta et al.
2008/0146268 A1 6/2008 Gandhi et al.
2008/0152101 A1 6/2008 Griggs
2008/0154601 A1 6/2008 Stifelman et al.
2008/0162482 A1 7/2008 Ahern et al.
2008/0165708 A1 7/2008 Moore et al.
2008/0177883 A1 7/2008 Hanai et al.
2008/0209050 A1 8/2008 Li
2008/0232574 A1 9/2008 Baluja et al.
2008/0313318 A1 12/2008 Vermeulen et al.
2008/0317222 A1 12/2008 Griggs et al.
2009/0052437 A1 2/2009 Taylor et al.
2009/0052641 A1 2/2009 Taylor et al.
2009/0074159 A1 3/2009 Goldfarb et al.
2009/0075684 A1* 3/2009 Cheng et al. .................. 455/466
2009/0089699 A1 4/2009 Saha et al.
2009/0093250 A1 4/2009 Jackson et al.
2009/0125608 A1 5/2009 Werth et al.
2009/0136011 A1 5/2009 Goel
2009/0171659 A1 7/2009 Pearce et al.
2009/0171669 A1 7/2009 Engelsma et al.
2009/0171752 A1 7/2009 Galvin et al.
2009/0220057 A1 9/2009 Waters
2009/0221310 A1* 9/2009 Chen et al. .................... 455/466
2009/0222341 A1 9/2009 Belwadi et al.
2009/0225748 A1 9/2009 Taylor
2009/0232289 A1 9/2009 Drucker et al.
2009/0252159 A1 10/2009 Lawson et al.
2010/0037204 A1 2/2010 Lin et al.
2010/0082513 A1 4/2010 Liu
2010/0087215 A1* 4/2010 Gu et al. ....................... 455/466
2010/0088187 A1 4/2010 Courtney et al.
2010/0088698 A1 4/2010 Krishnamurthy
2010/0115041 A1 5/2010 Hawkins et al.
2010/0142516 A1 6/2010 Lawson et al.
2010/0150139 A1 6/2010 Lawson et al.
2010/0188979 A1 7/2010 Thubert et al.
2010/0191915 A1 7/2010 Spencer
2010/0208881 A1 8/2010 Kawamura
2010/0217837 A1 8/2010 Ansari et al.
2010/0232594 A1 9/2010 Lawson et al.
2010/0235539 A1 9/2010 Carter et al.
2010/0251329 A1 9/2010 Wei
2010/0281108 A1 11/2010 Cohen
2011/0029882 A1 2/2011 Jaisinghani
2011/0078278 A1 3/2011 Cui et al.
2011/0081008 A1 4/2011 Lawson et al.
2011/0083179 A1 4/2011 Lawson et al.
2011/0096673 A1 4/2011 Stevenson et al.
2011/0176537 A1 7/2011 Lawson et al.
2011/0211679 A1 9/2011 Mezhibovsky et al.
2011/0255675 A1 10/2011 Jasper et al.
2011/0276892 A1 11/2011 Jensen-Horne et al.
2011/0280390 A1 11/2011 Lawson et al.
2011/0283259 A1 11/2011 Lawson et al.
2011/0299672 A1 12/2011 Chiu et al.
2011/0320550 A1 12/2011 Lawson et al.
2012/0036574 A1 2/2012 Heithcock et al.
2012/0201238 A1 8/2012 Lawson et al.
2012/0281536 A1 11/2012 Gell et al.
2012/0288082 A1 11/2012 Segall
2012/0290706 A1 11/2012 Lin et al.
2013/0156024 A1 6/2013 Burg

FOREIGN PATENT DOCUMENTS

EP 1464418 A 10/2004
EP 1770586 A1 4/2007
ES 2134107 A 9/1999
WO 02087804 11/2002
WO 2009018489 A 2/2009
WO 2009124223 A 10/2009
WO 2010037064 A 4/2010
WO 2010040010 A 4/2010
WO 2010101935 A 9/2010
WO 2011091085 A 7/2011

* cited by examiner

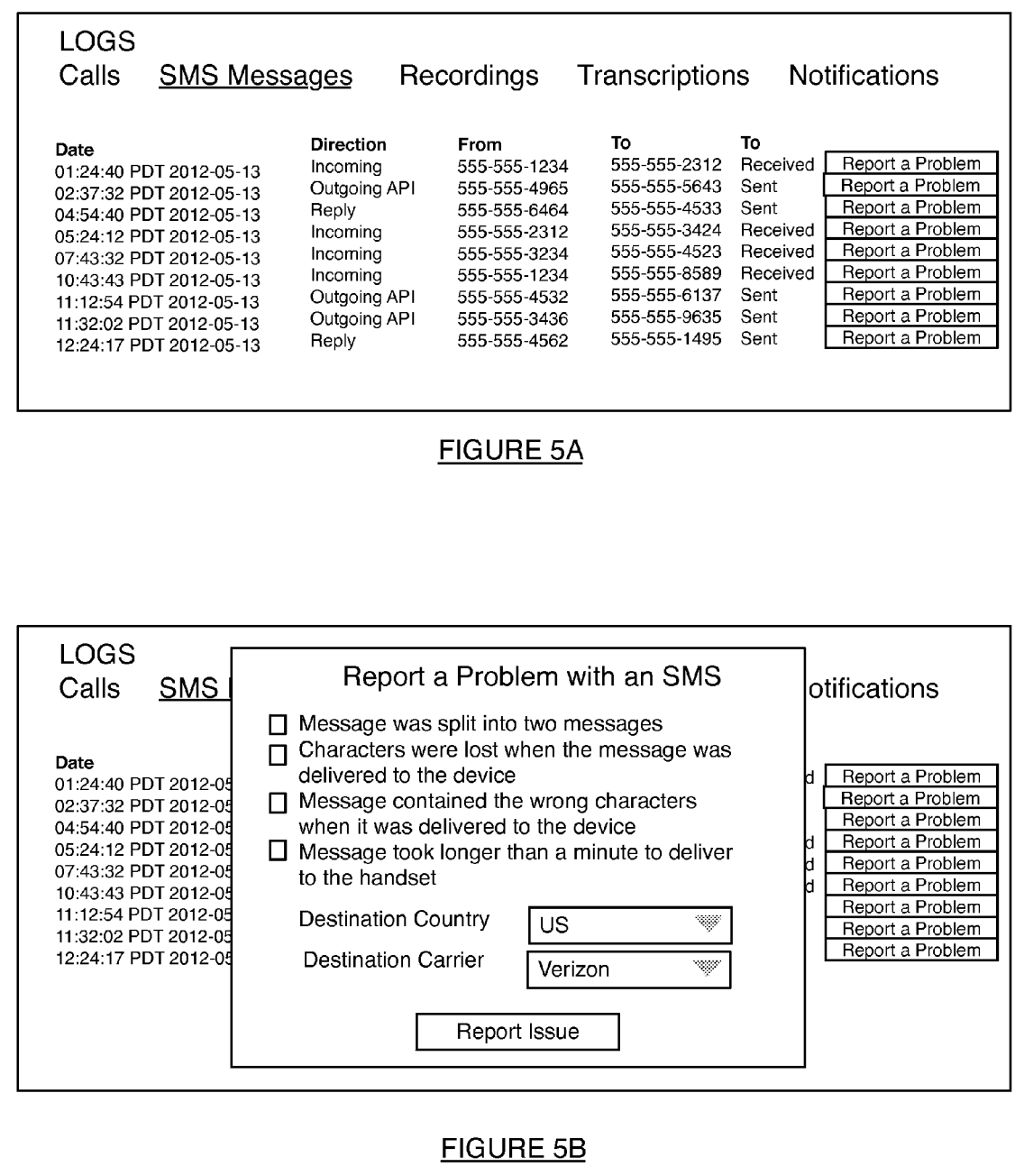

LOGS

Calls SMS Messages Recordings Transcriptions Notifications

| Date | Direction | From | To | To | |
|---|---|---|---|---|---|
| 01:24:40 PDT 2012-05-13 | Incoming | 555-555-1234 | 555-555-2312 | Received | Report a Problem |
| 02:37:32 PDT 2012-05-13 | Outgoing API | 555-555-4965 | 555-555-5643 | Sent | Report a Problem |
| 04:54:40 PDT 2012-05-13 | Reply | 555-555-6464 | 555-555-4533 | Sent | Report a Problem |
| 05:24:12 PDT 2012-05-13 | Incoming | 555-555-2312 | 555-555-3424 | Received | Report a Problem |
| 07:43:32 PDT 2012-05-13 | Incoming | 555-555-3234 | 555-555-4523 | Received | Report a Problem |
| 10:43:43 PDT 2012-05-13 | Incoming | 555-555-1234 | 555-555-8589 | Received | Report a Problem |
| 11:12:54 PDT 2012-05-13 | Outgoing API | 555-555-4532 | 555-555-6137 | Sent | Report a Problem |
| 11:32:02 PDT 2012-05-13 | Outgoing API | 555-555-3436 | 555-555-9635 | Sent | Report a Problem |
| 12:24:17 PDT 2012-05-13 | Reply | 555-555-4562 | 555-555-1495 | Sent | Report a Problem |

FIGURE 5A

LOGS

Calls SMS | otifications

Date

01:24:40 PDT 2012-05

02:37:32 PDT 2012-05

04:54:40 PDT 2012-05

05:24:12 PDT 2012-05

07:43:32 PDT 2012-05

10:43:43 PDT 2012-05

11:12:54 PDT 2012-05

11:32:02 PDT 2012-05

12:24:17 PDT 2012-05

Report a Problem with an SMS

- ☐ Message was split into two messages
- ☐ Characters were lost when the message was delivered to the device
- ☐ Message contained the wrong characters when it was delivered to the device
- ☐ Message took longer than a minute to deliver to the handset Destination Country: US Destination Carrier: Verizon Report Issue d Report a Problem Report a Problem Report a Problem d Report a Problem d Report a Problem d Report a Problem Report a Problem Report a Problem Report a Problem

FIGURE 5B

METHOD AND SYSTEM FOR CONTROLLING MESSAGE ROUTING

CROSS-REFERENCE TO RELATED APPLICATIONS

This application claims the benefit of U.S. Provisional Application Ser. No. 61/676,261, filed on 26 Jul. 2012, and U.S. Provisional Application Ser. No. 61/751,773, filed on 11 Jan. 2013, which are incorporated in their entirety by this reference.

TECHNICAL FIELD

This invention relates generally to the telephony messaging field, and more specifically to a new and useful method and system for controlling message routing in the telephony messaging field.

BACKGROUND

Text messaging is one of the most widely used communication methods in the world. In recent years, telephony based applications have been able to utilize text and multimedia messaging as a form of communication with users. Despite the wide use of text messaging, the underlying infrastructure is complex and obfuscated. Telephony infrastructure is highly dependent on constantly changing contracts, negotiations, and international regulations. As a result, application platforms and other parties wishing to facilitate the sending and receiving of messages in some situations do not retain control over how a message is sent. Platforms sending a message often must trust partners and other parties to deliver the message. Those partners and parties may also rely on other parties to participate in message delivery. There is little visibility into message delivery. Delivery receipts can be used to indicate if a message delivery succeeded or failed. However, the delivery reports are often unreliable and cannot always be a trusted indicator of message delivery.

Additionally, when sending a message in a telephony system, such as sending a short message service (SMS) message, the message is routed through multiple messaging nodes. The intermediary nodes through which the message passes may be operated by various networks, may reside in arbitrary locations, may have various protocols for handling messages, or may impact the outcome of message routing in a number of alternative ways. In the current telephony messaging ecosystem, a single party does not control the dynamics of how messages are routed. Thus, the route of a message is highly dependent on multiple variable parties. Messages may be altered, delayed, dropped, split into multiple messages, suffer from character encoding issues, or have any number of issues due to the message handling of an encountered node on the message's way to the destination. This makes it extremely difficult for a party wishing to send and/or receive a message to ensure the integrity and reliability of communicating a message. Thus, there is a need in the telephony field to create a new and useful method and system for controlling message routing. This invention provides such a new and useful method and system.

BRIEF DESCRIPTION OF THE FIGURES

FIGS. 5A and 5B are screenshots of an exemplary embodiment providing a user feedback interface;

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
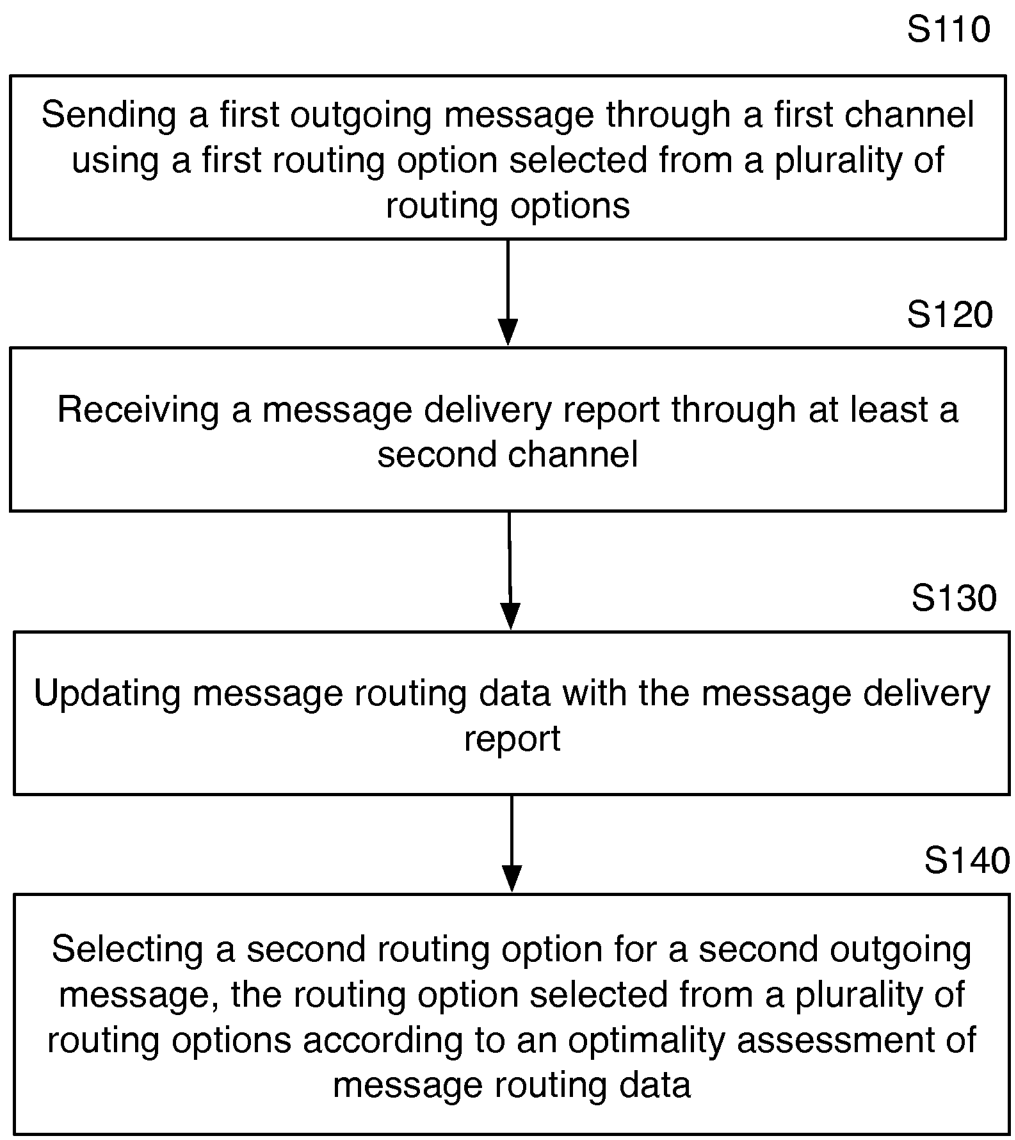
FIG. 1 is a flowchart representation of a preferred embodiment of the invention.
Figure 2:
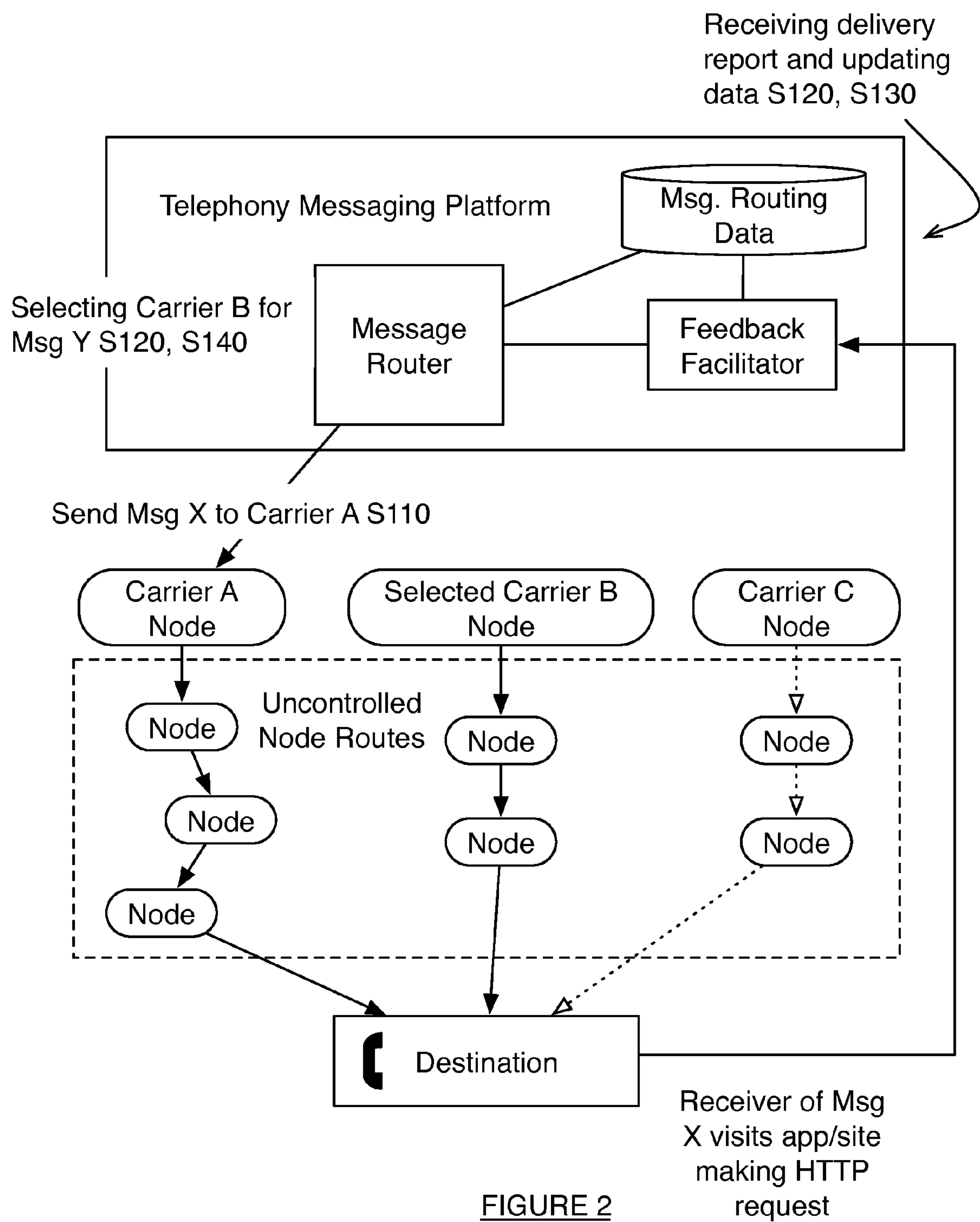
FIG. 2 is a schematic representation of a preferred embodiment of the invention.

As shown in FIG. 1, a method for controlling message routing of a preferred embodiment includes sending a first outgoing message through a first channel using a first routing option selected from a plurality of routing options Block S110, receiving a message delivery report through at least a second channel Block S120, updating message routing data with the message delivery report Block S130; selecting a second routing option for at least a second outgoing message, the second routing option selected from the plurality of routing options according to an optimality assessment of the message routing data Block S140. The method functions to enable real-time adjustments to message routing according to feedback through a secondary channel. The first channel is typically characterized by having intermediary node-to-node transmissions uncontrolled by either the sender or the receiver as shown in FIG. 2. For example, in short message system (SMS) transmission, the method implementer preferably routes the message to one of a selection of routing options, and after that initial routing node, the message is routed through various nodes in route to a destination. The various intermediary nodes are typically unspecified by the transmitter. Additionally, information about the routing of a message may not be exposed to the original transmitter.

The method is preferably implemented by a telephony platform with messaging support such as the telephony platform described in published U.S. Patent Application No. 2009/0252159, titled "SYSTEM AND METHOD FOR PROCESSING TELEPHONY SESSIONS", which is hereby incorporated in its entirety by this reference. Telephony messaging preferably includes SMS, multimedia messaging service (MMS), image messaging, animation messaging, video messaging, audio/music messaging, internet protocol (IP) messaging, push notifications, and/or any suitable messaging technique. The method may alternatively or additionally apply to messaging mediums outside of the telephony field. The telephony platform preferably includes a message router responsible for sending and/or receiving messages. The message router is preferably configured to have at least two routing options. The second channel is preferably a channel differing from the first channel. In one exemplary variation, the first channel is a SMS message routing channel and the second channel is an internet network channel. A system implementing the method may include system components such as user feedback interface coupled to the telephony platform, a link redirector, a pin code API service, or any other suitable feedback mechanism for capturing and communicating feedback. As the routing patterns of a routing option may vary considerably with time, the method preferably obtains feedback through the second channel and responds by updating a new selected routing option in substantially real time. In some variations, the feedback requires action by the receiver of the message. After feedback is acquired the selected routing option for subsequent messages may be updated appropriately.

Block S110, which recites at a message router sending a first outgoing message through a first channel using a routing option selected from a plurality of routing options, functions to exercise the control of a sender over the routing of a message. The message router is preferably configured to have a plurality of message routing options. Routing options are preferably different initial nodes to which a message may be initially sent. The routing options may be characterized by different service providers, networks, geographic locations, physical machines, resource addresses, contractual agreements, communication protocols, time-dependent quality/performance properties, and/or any other suitable distinguishing characteristics of message routing node. For example, a message router may be configured to selectively transmit a message to one of four different service providers. Depending on the message medium and possibly the source and destination endpoints, the routing options may be different channel protocols directed at different service provider destinations. For an SMS message, the routing options may be SMPP connections to various service provider destinations. For an MMS message, the routing option may be an SMTP connection to various service provider destinations. Depending on the used protocol, the routing options of an MMS message can be SMTP connections to various service provider destinations (for MM4) or alternatively they can be various service resources accessed over HTTP/SOAP (for MM7). The routing options preferably include various commercial relationships between the service provider and the communication platform. As another example, a message router may be configured to selectively transmit a message using a routing option selected from SMS routing options, proprietary push notification routing options (e.g., Apple or Google push notifications) and application messaging routing options (e.g., message sent to a Whatsapp user). The message router may or may not have visibility into the routing beyond the initial node. The selection of an initial node preferably functions as a fundamental point of control to the full route a message will take to arrive at a destination. In one preferred embodiment the method is preferably implemented in a continuous manner, such that the first selected routing option was preferably selected according to an optimality assessment as described below for Block S140. The first channel is preferably the messaging channel such as communication with a SMS or MMS gateway used to communicate the message to the destination. In some situations, internal routing such as over the internet may be used to access additional routing option. There may additionally be a plurality of types of channels available for sending a message such as SMS or MMS, push notifications, or any suitable messaging channel. The outgoing message is preferably sent to a single destination endpoint (e.g., a phone number) but may alternatively be sent to a plurality of endpoints. In a variation where the outgoing message is sent to a plurality of destination endpoints, Block S130 preferably includes receiving message delivery reports through at least a second channel for a plurality of destination endpoints.

Block S120, which recites receiving a message delivery report through at least a second channel, functions to obtain feedback from the message destination. The message delivery report preferably indicates the status of the message at the destination endpoint, and the message delivery report is preferably generated in response to the message arriving at the destination. In one variation, the message delivery report indicates the success or failure of message delivery to the intended destination(s). If a message is received, the message delivery report will preferably indicate that the message was successfully received. The message delivery report will preferably include an indicator that the message was undelivered if the message is not received at the destination. An undelivered message delivery report is preferably sent after a specified amount of time has elapsed. The time out period is preferably the maximum satisfactory amount of time a message should take to be delivered to a destination. This timeout may additionally be dynamically adjusted based on the destination to accommodate for longer than expected delivery times. The delivery report may additionally or alternatively include other information about the message received at the destination such as message condition. Message condition preferably describes properties such as if the message was altered, censored, truncated, encoded improperly, split into multiple messages, or otherwise not conforming to the original outgoing message.

The message delivery report is preferably received in near real-time (e.g., under a minute from a message being delivered or classified as undelivered), but the message delivery report may occur at any suitable time. For example, message delivery reports may be retrieved or collected at designated intervals. In an alternative variation described below, the message delivery report may be collected from user feedback at a time well after the message has been received.

Preferably the delivery report is transmitted in response to an action at the destination endpoint, but delivery reports may be stored and actively retrieved by the message router or any suitable system. For example, the status of a message in the form of a delivery report may be an accessible resource accessed through an API. A default delivery report status may be set or assumed. For example, if no message delivery report is received, then the report for the transmission of the sent message may default to un-received status until the delivery report is updated based on a received message.

Figure 3:
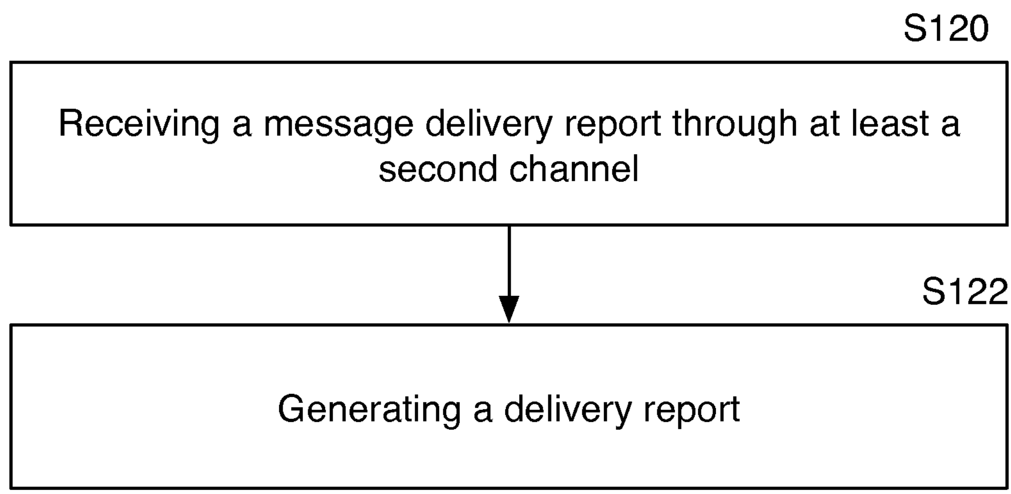
FIG. 3 is a flowchart depicting a variation of a preferred embodiment of the invention for generating a delivery report.

Additionally, Block S120 of a preferred embodiment may additionally include generating a delivery report S122 as shown in FIG. 3, which functions to facilitate extracting message outcome from the destination. Generating a delivery report may include a number of various implementations. The channel of the delivery report at least in part comes through a second channel. Some exemplary approaches to collecting a delivery report may include providing a user feedback interface S123, redirecting internet and app links through a monitored system S124, providing a monitored pin code service S125, monitoring a user-reply signal S126, and/or using any suitable alternative technique. The different channels may be capable of collecting varying types of information of either qualitative or quantitative measures. The different channels may have varying relevance to the immediate receipt of a message, integrity of a message, user-perceived quality of a message, and other suitable qualities of a message.

Figure 4:
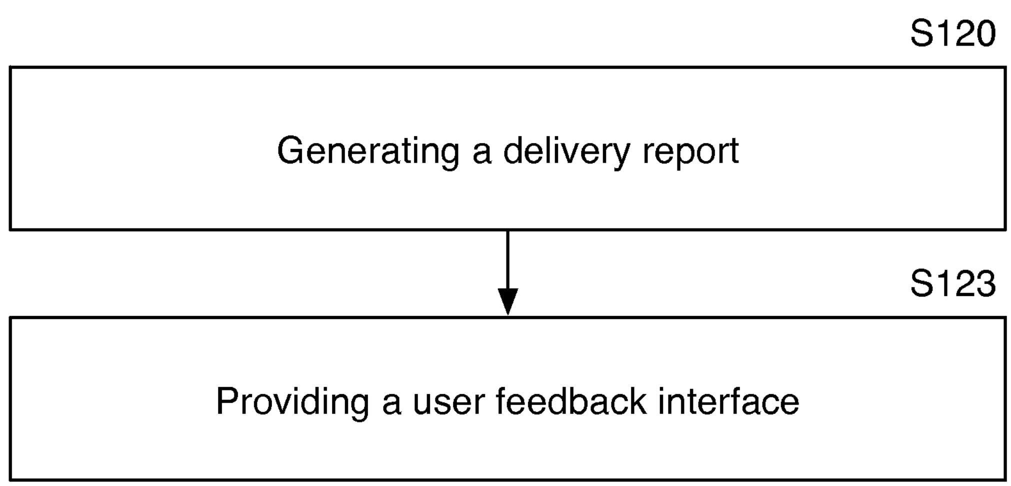
FIG. 4 is a flowchart depicting a variation of a preferred embodiment of the invention for providing a user feedback interface.

As shown in FIG. 4, a variation of the preferred embodiment may include providing a user feedback interface Block S123, which functions to enable reports to be filed through an application programming interface (API) or a visual interface. The interface preferably enables issues with the delivery of a particular message to be logged. As shown in FIGS. 5A and 5B, a user may select a message and file a report. The filed report preferably updates the delivery report, which in turn will be factored into the optimality assessment for future messages. Similarly, reports may be filed programmatically using an API. This preferably enables developers of messaging applications to provide their own user-facing interface. The API is preferably used to collect message, voice, and/or video quality from a user (e.g., a user of a service or a developer). In one variation, a developer may integrate a poll during an interaction with an application, preferably at the end of the interaction. The user response to the poll is then added to a delivery report using the feedback API. In another variation, a developer may develop custom logic in their application to detect quality or deliverability issues. When an issue is detected, the application of the developer preferably uses the API to add information to a delivery report. The API may alternatively be used in any suitable manner.

Figure 6:
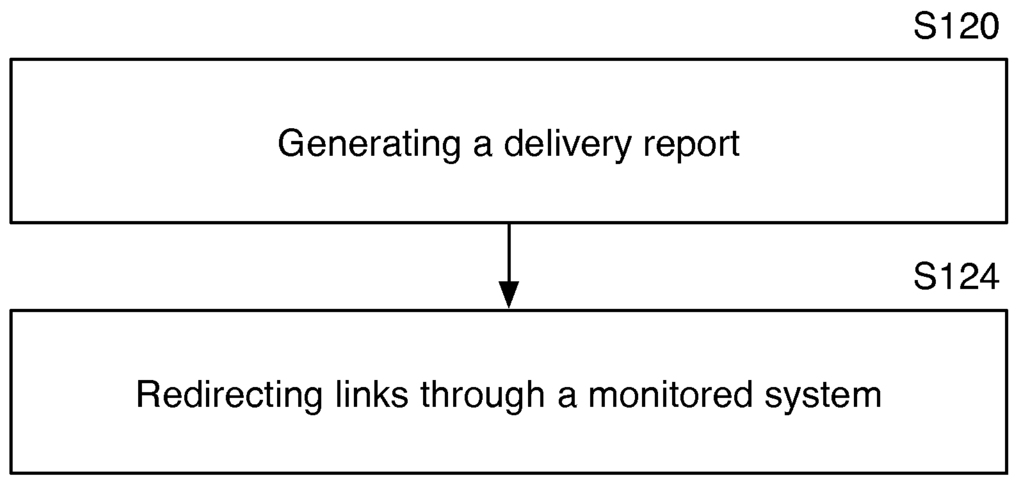
FIG. 6 is a flowchart depicting a variation of a preferred embodiment of the invention for redirecting links through a monitored system.
Figure 7:
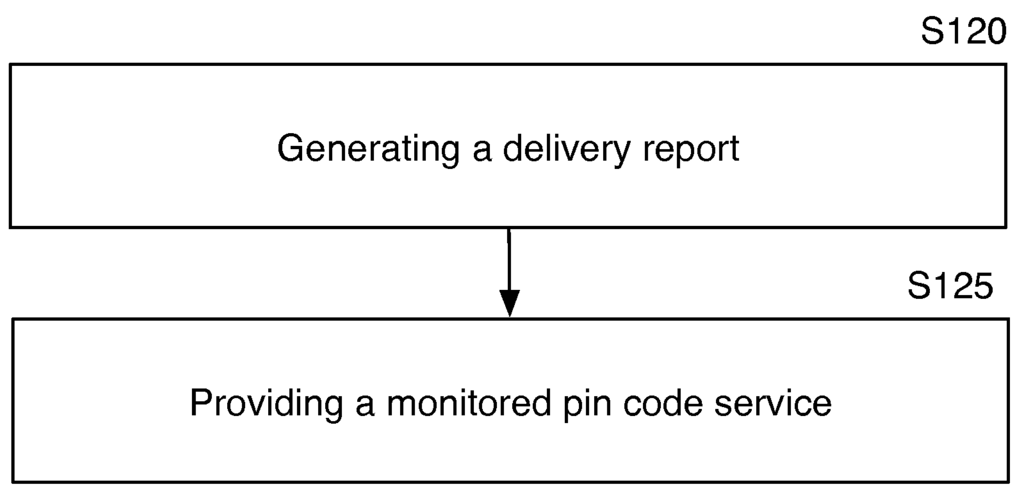
FIG. 7 is a flowchart depicting a variation of a preferred embodiment of the invention for providing a monitored pin code service.

As shown in FIG. 6, a variation of the preferred embodiment includes redirecting links through a monitored system Block S124, which functions to place an intermediary component capable of generating a delivery report once an action was taken for a particular message. In many situations, messages may include a link to a URI, app, or any suitable resource, and this technique can preferably be applied to such messages. When a link is detected in a message, a trackable link specific for a particular message transaction is preferably generated and used in place of the original link. Alternatively a service may be provided such that the creator of the message may add the link to the message independently. The trackable link will preferably lead to a URI which, when visited, indicates that the message has been received and at least in part was not corrupted, at least to the extent that the link was successfully visited by the recipient of the message. After visiting the trackable link, the link preferably redirects the user to the original resource linked to in the message. As shown in FIG. 7, similar variation of the preferred embodiment may include providing a monitored pin code service Block S125, which functions to monitor a code for user activation. This technique works in a similar manner, in that it relies on a pin code being transmitted in the message and then acted upon by the user. If a user correctly acts on the pin code, the message is assumed to have been received and not corrupted. This variation may be applicable in messages being used in a form of secondary verification in a login system. The pin code is preferably unique for a particular message transaction. A pin code API preferably receives a notification that the pin code has been entered, and the delivery report is preferably generated for the message containing that pin code. The pin code API may additionally validate the pin code or provide any other suitable service with the pin code. But the act of being notified the pin code was entered is preferably interpreted as the message being received. As described below, the variation of Blocks S124 and S126 may be applied towards an embodiment used in testing or facilitating the selecting of routing options.

Figure 8:
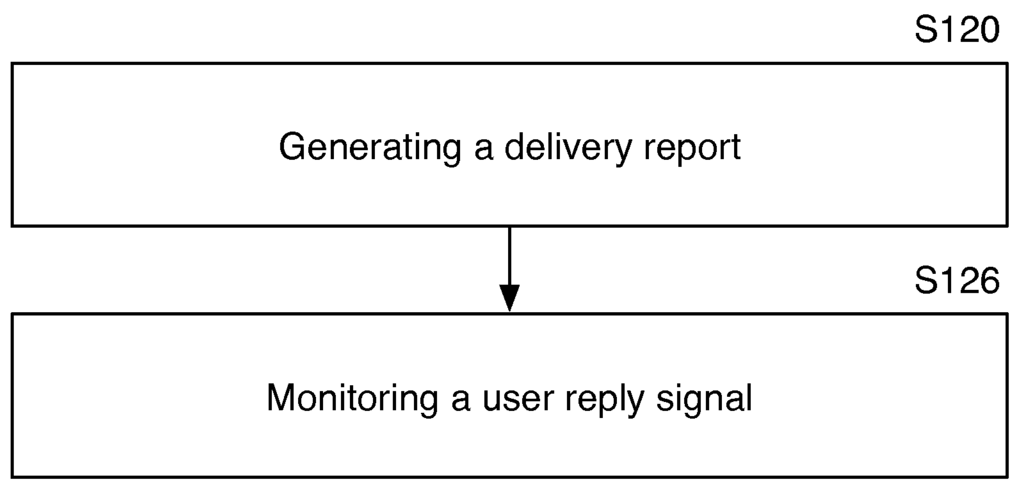
FIG. 8 is a flowchart depicting a variation of a preferred embodiment of the invention for monitoring a user reply signal.

As shown in FIG. 8, another variation of the preferred embodiment includes monitoring a user-reply signal Block S126, which functions to determine if a message was delivered based on a message response from the destination. If a message requests or necessitates a message response to the endpoint sending the message or to any other observable endpoint, then the user reply signal may provide information of whether a message was delivered. Preferably, this variation is employed when the sending endpoint or a reply endpoint are managed by the message routing system. For example, if the operator of the method provides messaging endpoints for the sender, then any communications going to that endpoint will preferably go through the message routing system. A response following the outgoing message will preferably indicate that the user received the message, and that the message was understandable. There may additionally be a time-window or other rules for determining when the response from the destination endpoint is associated with the outgoing message. Additionally, the response may be analyzed to determine if the user understood the message (e.g., the user correctly followed instructions). If the user response does not fall within an expected response pattern, then the first outgoing message may not have been accurately communicated to the desired destination.

Block S130, which recites updating message routing data with the message delivery report, functions to adjust the criteria used in selecting routing options of messages in Block S140. The information included in the message delivery report is preferably added to message routing data that is preferably a record of previous delivery reports. The message routing data is preferably used to improve subsequent message routing. In other iterations of the method the sending of a message through a routing option will typically use a routing option that is preferably more optimal than the initially used routing option according to the collected delivery report. Updating the message routing data can include ranking routing options based at least in part on delivery success rates. Other properties of the routing option may additionally be considered such as price, contract obligations, time of day. Alternatively, the message routing data may only store a limited number of delivery reports. The message routing data may be limited to data associated to messages sent in a particular time-window, the nth most recent outgoing messages, or any suitable group of data. The message routing data may additionally include data from sources other than the delivery reports. Data or parameters from routing option contracts, data from message routing infrastructure such as Signaling System No. 7 (SS7), or any other resource that may be used in determining an optimality assessment. The optimality assessment, mapping for optimal/preferred/recommended routing options, may be updated on receipt of new message delivery reports, but alternatively, the data from delivery reports may be added to the message routing data and optimal new routing options calculated periodically, when a new message requires routing, or at any suitable time. The message routing data is preferably used to improve message delivery performance. In a variation described where outgoing messages are classified, message routing data is preferably stored with an associative link between a message classification type and the message delivery report. This allows historical data to be filtered based on message classification.

Block S140, which recites selecting a second routing option for a second outgoing message, the second routing option selected from the plurality of routing options according to an optimality assessment of the message routing data, functions to determine a preferred way to route a message. As indicated above, the selection of an initial node preferably functions as a fundamental point of control to the full node-to-node route a message will take to arrive at a destination. The optimality assessment is preferably a statistical computation for determining the optimal routing option for a particular destination endpoint. The optimality assessment may factor in message delivery rate, delivered message quality, message delivery time, cost, time of day, message properties/classification, or any suitable parameter of message communication. Additionally, the operator of the message router may consider additional factors in the optimality assessment. For example, an operator may have various service agreements for the plurality of routing options, some of which may have minimum messaging requirements that must be satisfied during a specified time period. Such data is preferably stored in the message routing data, but may be stored or retrieved from any suitable source.

In a variation of the preferred method, the optimality assessment may indicate a processing rule to be applied to a message for a particular routing option. For example, a message may be edited, split, encoded into a different format, translated, compressed, linked to through a URL, or otherwise altered in any suitable manner. The processing rule is preferably applied to mitigate poor messaging performance based on historical data collected. This may be performed for particular regions or message types that historically have poor messaging performance for all routing options or perhaps could see improved deliverability if altered.

Figure 9:
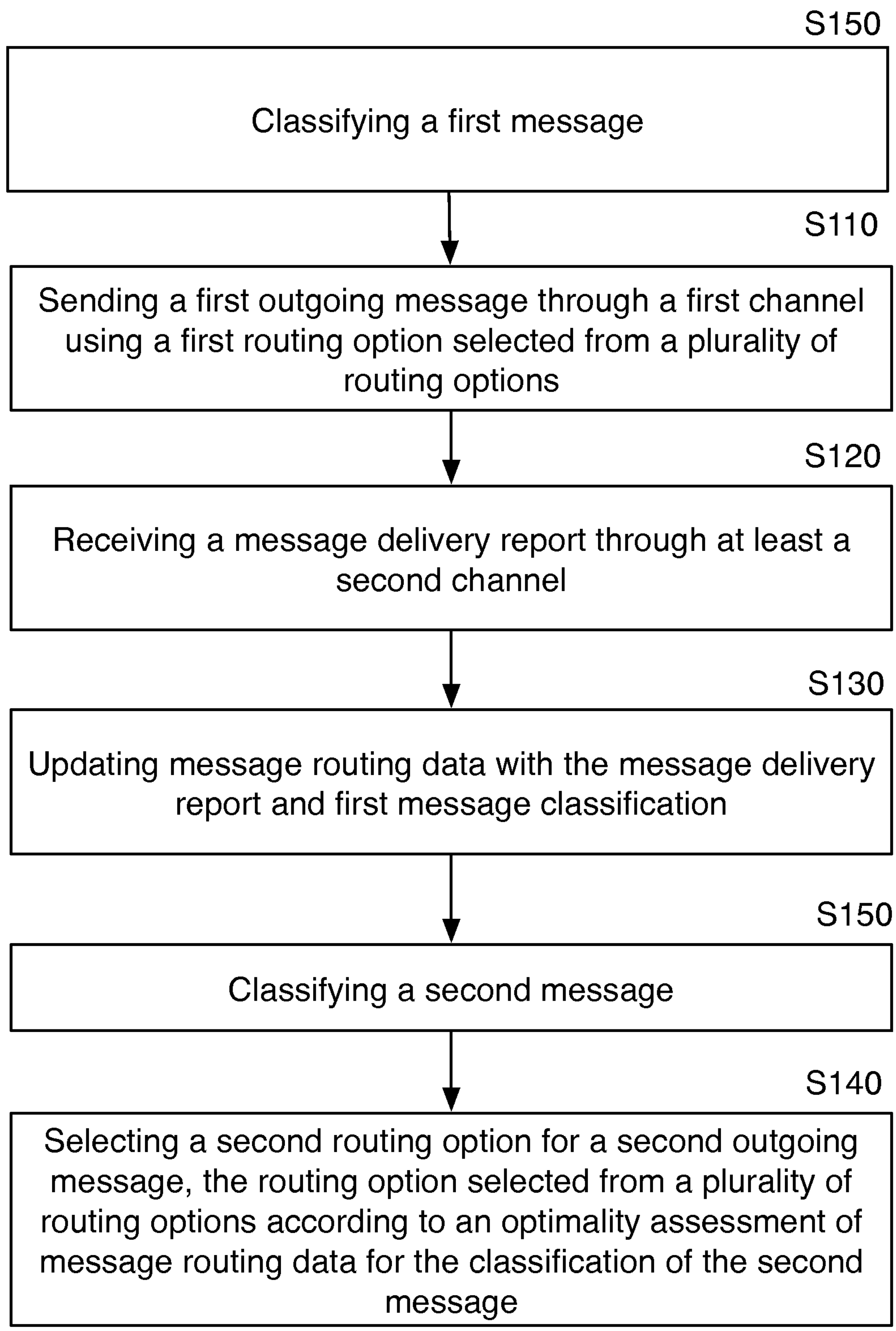
FIG. 9 is a flowchart depicting a variation of a preferred embodiment of the invention for classifying a first and second message.

As shown in FIG. 9, a method of a preferred embodiment may additionally or alternatively include classifying the first and second outgoing message Block S150, wherein the optimality assessment associated with the determined message classification is used to select the routing option. An outgoing message is preferably classified prior to selecting a routing option. For example, a message may be classified as a marketing message if the message appears to be an automated solicitation as determined by natural language processing. Other classifications may include human-typed message, pincode message, web or app link message, associated media type message, junk message, or any other suitable message classification. Alternatively or additionally, the first and second outgoing messages may be classified according to the transport properties of the message. The transport properties of a message preferably include if the source or destination use a short code, long code, IP messaging. Similarly, a message may be classified by geographic region as detected through source or destination endpoints or detected in any suitable manner. Similarly, messages may be classified according to languages or characters used in the message. The message classification preferably enables the message router to select the initial node according patterns in how types of messages are routed. The message routing data is preferably maintained such that data from a delivery report can be associated with the message classification of the associated outgoing message. In this manner, routing performance may be segregated according to the type of message. If a routing option (due to internal routing rules of a network or region) often filters or drops particular types of messages, the classification and optimality assessment will preferably elect to select a different routing option where the message will be delivered with a higher performance.

Figure 10:
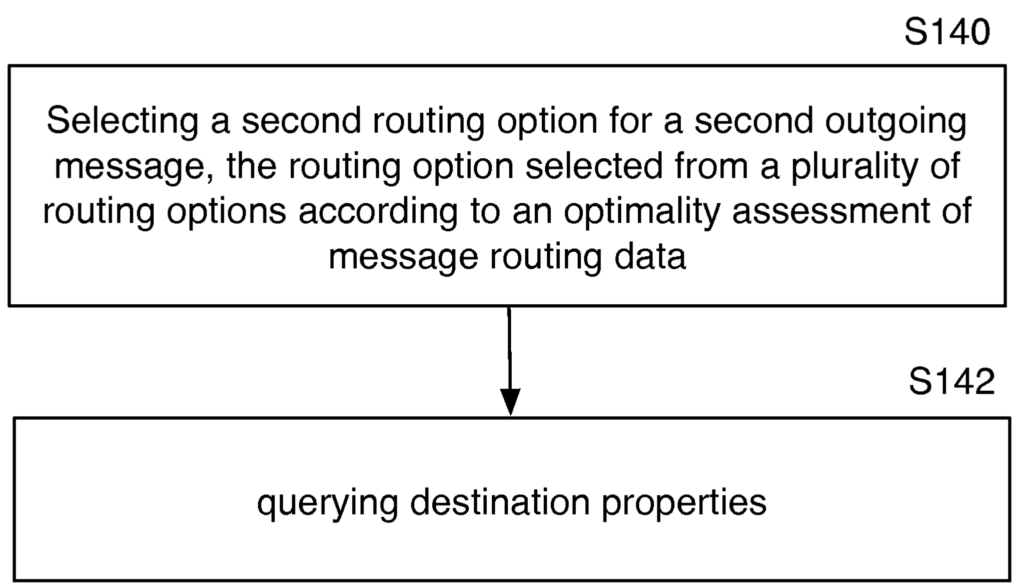
FIG. 10 is a flowchart depicting a variation of a preferred embodiment of the invention for querying destination properties.

Additionally, selecting a routing option of Step S140 may include querying destination properties S142 as shown in FIG. 10. Destination properties may indicate a geographic region of the number, destination network, price of messaging through a route, and any suitable characteristic of the message transmission. This destination information may be collected from a service, such as the telephony number mapping facility E.164 Number Mapping (ENUM), Home Location Register (HLR), or Visitor Location Register (VLR). Alternatively, destination and routing data may be collected during operation of the messaging system or from any suitable source. Block S142 may be used in combination or in cooperation with Block S150.

Figure 11:
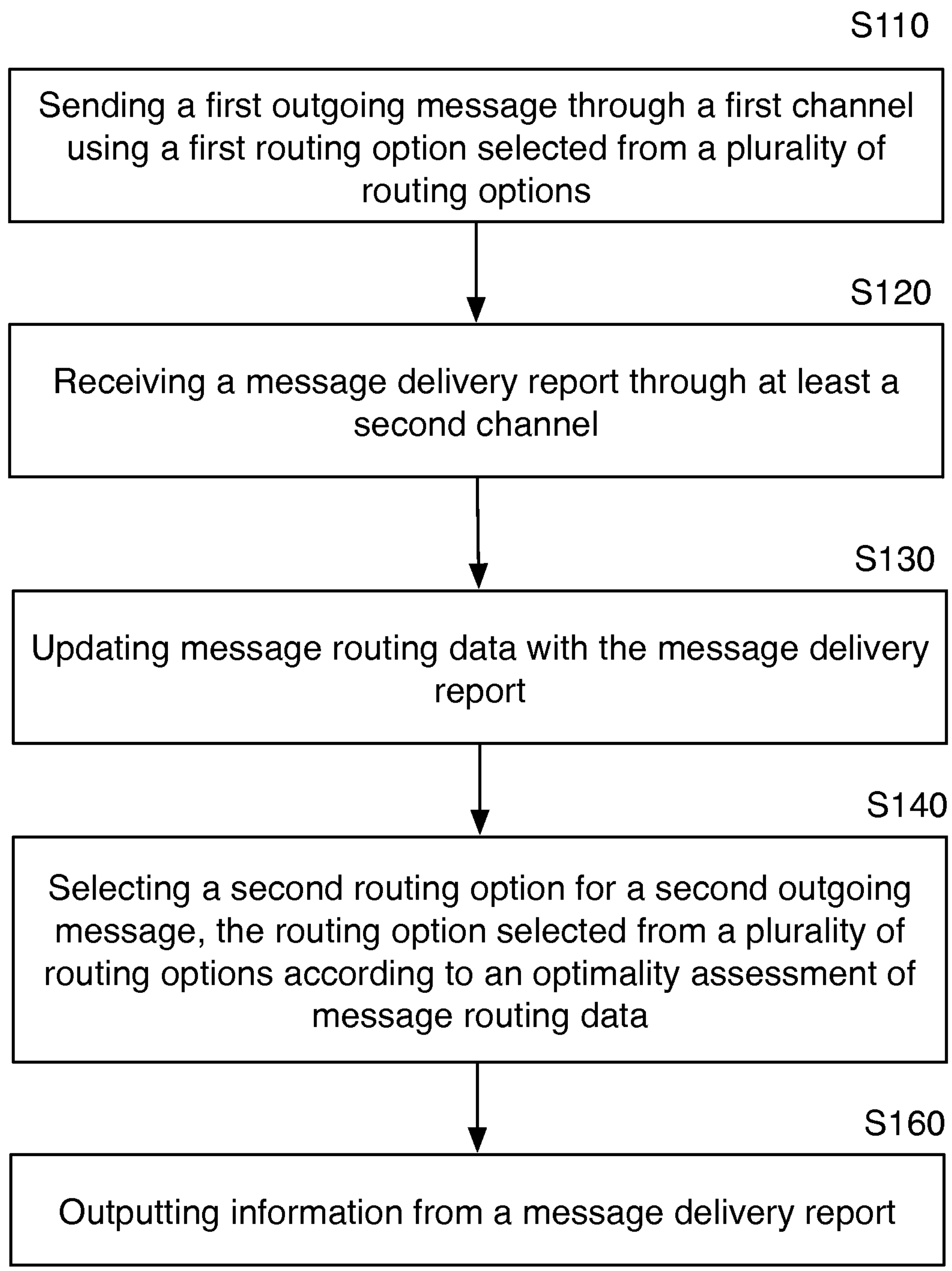
FIG. 11 is a flowchart depicting a variation of a preferred embodiment of the invention for outputting information from a message delivery report.

As shown in FIG. 11, a method of a preferred embodiment may additionally or alternatively include outputting information collected from a message delivery report Block S160, which functions to enable application developers using the messaging platform to act on events and information included in the message delivery reports. Outputting delivery report information may include passing information through a webhook, publishing-subscription channel, logging, triggering an event, or through any suitable technique. An application will preferably integrate the outputted information into the business logic of their application to perform any suitable task. An application, application developer, or any suitable system can preferably use the outputted information, and a plurality of entities may access the outputted information. The outputted delivery report may include all the collected information or a subset of information in the received message deliver reports. This information may include the message delivery status, such as delivered, undelivered, corrupted, truncated, improper encoding, or any suitable delivery status. The information may additionally or alternatively include raw information collected through the second channel, such as recipient/customer feedback or customer message replies. Any suitable information collected through the method may additionally or alternatively be outputted.

Figure 12:
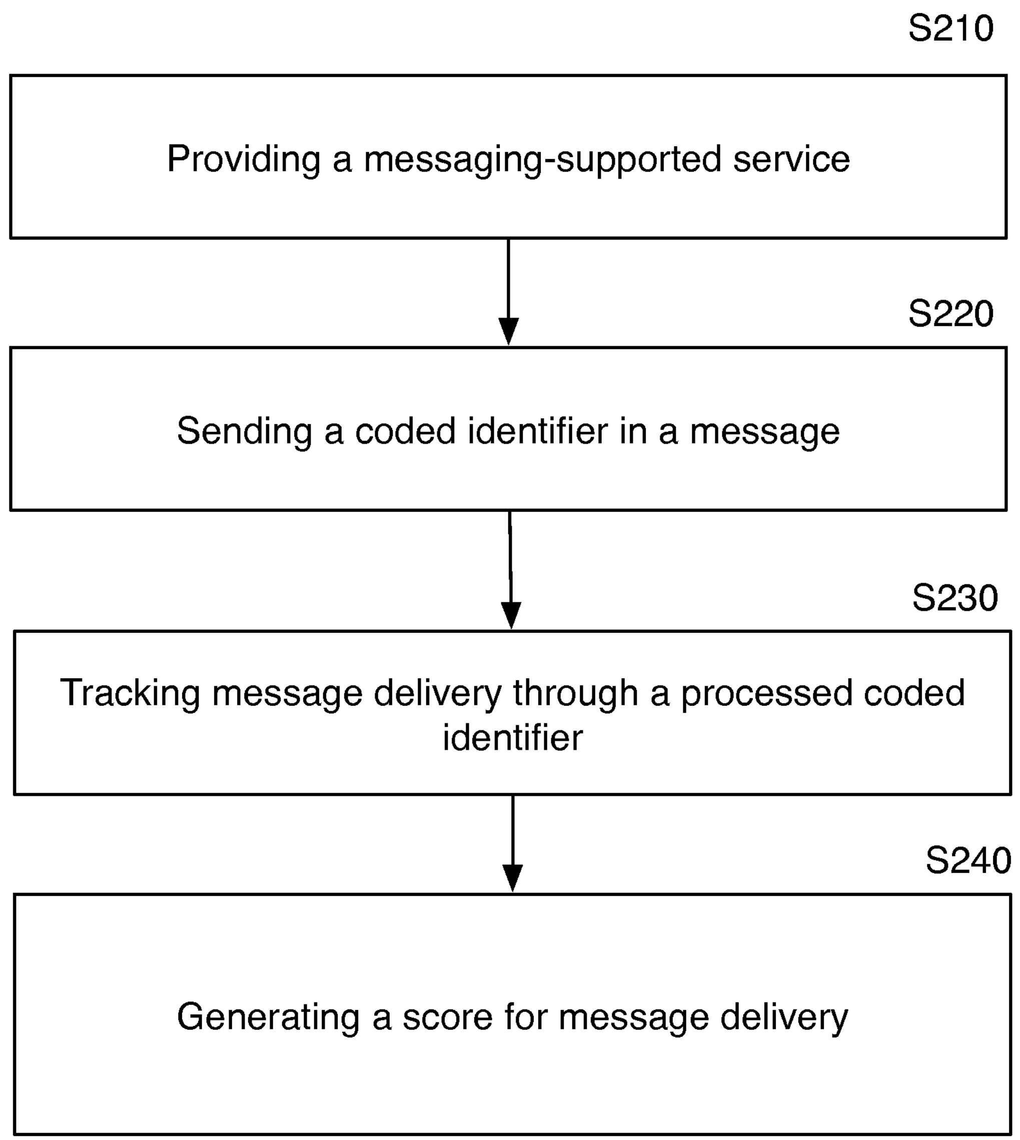
FIG. 12 is a flowchart representation of a preferred embodiment of the invention.

As shown in FIG. 12, a method of a second preferred embodiment can include providing a messaging-supported service S210, sending a coded identifier in a message S220, tracking message delivery through a processed coded identifier S230, and generating a score for message delivery S240. The method functions to implement a service that, as at least one benefit, enables the testing of message communication through use of the service. The messaging-supported service may be any suitable service. Typically, an operator of a messaging platform will implement the service, but any suitable entity may alternatively implement the method. The score reflects the operational health of messaging communication and more preferably a messaging routing option. The score is obtained through the transformation of service communication to a trackable user interaction. Some embodiments of the method, in a sense, transparently crowdsources communication testing to users of the messaging-supported service. The score is preferably related to specific routing options and may be used in the determination of subsequent routing options such as in the method described above. The method may additionally supplement message delivery reports of the above method. Alternatively, the method may be used for communication quality/health analytics, error detection, or any suitable application.

Block S210, which includes providing a messaging-supported service, functions to implement a service that forces user interaction with a second channel as a result of a message received in a first channel. The service preferably promotes expected user behavior when a message is delivered. Typically, the user behavior required to complete a request is the result of an initial user interaction with the service. For example, a two-factor authentication service often includes the user behavior of reading and entering in a code delivered over SMS, MMS, voice, or other communication medium. Alternatively, the user behavior may be one that a typical user feels compelled to complete based on the request of another entity. For example, a user will typically view links and/or media sent by a friend. If the service is a link shortening and messaging service, content sent through the service can enable the tracking of message delivery. In addition to a two-factor authentication service, the messaging-supported service may be a link-shortening service, a media-proxying service, a coupon code service, an application-notification service, a game mechanic service (e.g., virtual item collection), and/or any suitable service.

Block S220, which includes sending a coded identifier in a message, functions to use a unique identifier used in detecting a completed user interaction. The coded identifier is preferably unique to a particular message. The messaging-supported service preferably creates a mapping between the identifier and at least one component of the communication (e.g., the routing option, the communication destination, message content, etc.). The coded identifier may be a text or graphical code readable by a user or machine. The user will typically be required to report the text or graphical code through a second communication channel (e.g., a webpage login screen or in a coupon redemption form). Similarly, a code-reader may scan and read the code. The coded identifier may alternatively be redirection-URI. The redirection URI is a tracking URI that monitors when a user accesses the URI and also redirects a user to an original URI. The redirection URI may additionally be a shortened URI. In a similar variation, the message includes a resource link that sends a user to a controlled resource. The controlled resource may be a webpage, an application, or any suitable resource. The controlled resource is preferably monitored and when a user accesses that resource that action can be mapped to a coded identifier associated with the communication. Any other suitable coded identifier may alternatively be used.

Block S230, which includes tracking message delivery through a processed coded identifier, functions to identify when a coded identifier is triggered. The message delivery is preferably tracked through a communication channel that is different from the one used in transmitting the message. A coded identifier is preferably triggered when a user completes a user interaction associated with the coded identifier. The user interaction is preferably logically associated with the receipt of the sent message. So when a user completes the desired user interaction, explicitly or implicitly using the coded identifier, the service can determine if a message succeeded or failed in delivery. Other states of message deliverability may also be tracked such as pending, message corruption, delivery delay, delivery error, or any suitable state of message delivery. In tracking delivery delay, the time between sending the message and completing the user interaction is preferably tracked. The time from sending to first interaction may have a strong correlation to speed of delivery, especially in certain variations where user interaction is expected to occur immediately after message delivery.

In a variation where the service is a two-factor authentication service, block S220 includes sending an authentication code. The code is used for authenticating a user by providing some level of proof that the user has access to a particular device, as is commonly done in two-factor authentication. Message delivery is preferably marked as delivered if the code is correctly verified and used in authenticating the user. Message delivery is preferably marked as a failed delivery if the user does not complete authentication. Additionally, message delivery may be marked with corrupted delivery, encoding failure, or some other error diagnosis if the code is incorrectly entered but follows patterns of a corrupted message delivery. The two-factor authentication service can be extended to a coupon redemption service. The coupon service preferably delivers requested coupons to a user in an SMS or other message. The user is required to enter a code or scan a graphic to redeem the coupon.

In a variation where the service is a link shortening service, block S220 includes converting a URI to a redirection URI. When a user clicks on the redirection URI, a browser is preferably directed to the redirection URI. The redirection URI is preferably unique to that message. A message is preferably marked as successfully delivered if the redirection URI is visited. The message delivery state preferably defaults to un-delivered unless the redirection URI is visited.

Block S240, which includes generating a score for message delivery, functions to use tracked message delivery across the message-supported service to determine a state of message communication. The score preferably relates to the quality of message deliverability. The message-supported service can additionally selectively use different message delivery options to generate a score for particular communication options. For example, the service can track what routing option is used for sending the coded identifier, and message delivery is tracked for that particular routing option. Steps S220 and S230 are preferably performed a plurality of times for different users and messages during various uses of the service. The combined usage of the service enables a plurality of communication data samples. The results are preferably consolidated and used together to generate a score. With a wide variety of samples, the score may be function of one or more variables such as time of day, carrier, originating endpoint, destination endpoint, origination geographic location, destination geographic location, message content, and/or any suitable communication variable. The score may be used in the determination of routing options, providing communication analytics, or used in any suitable application.

Figure 13:
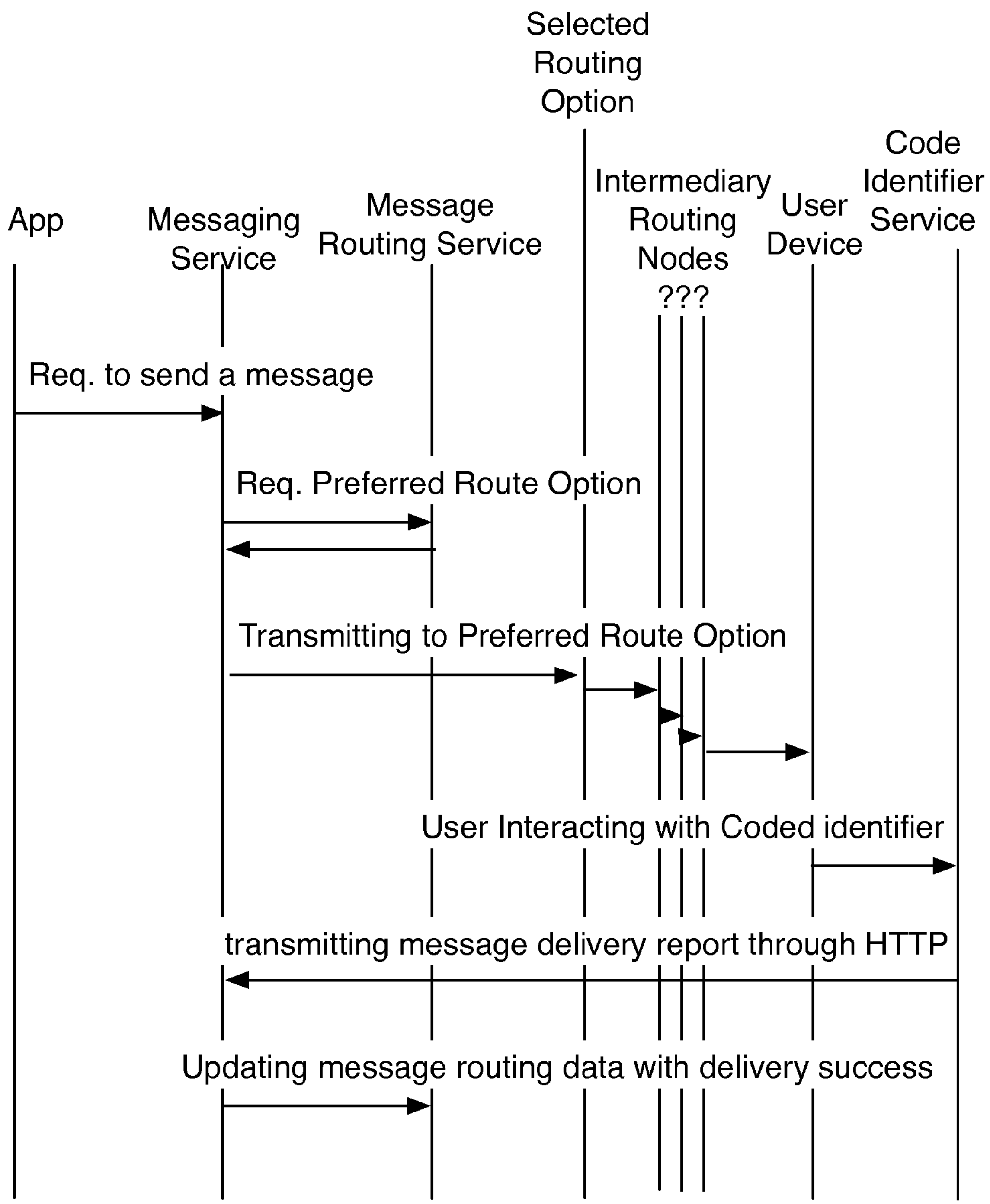
FIGS. 13 and 14 are communication flowcharts of scenarios of a coded identifier implementation.
Figure 14:
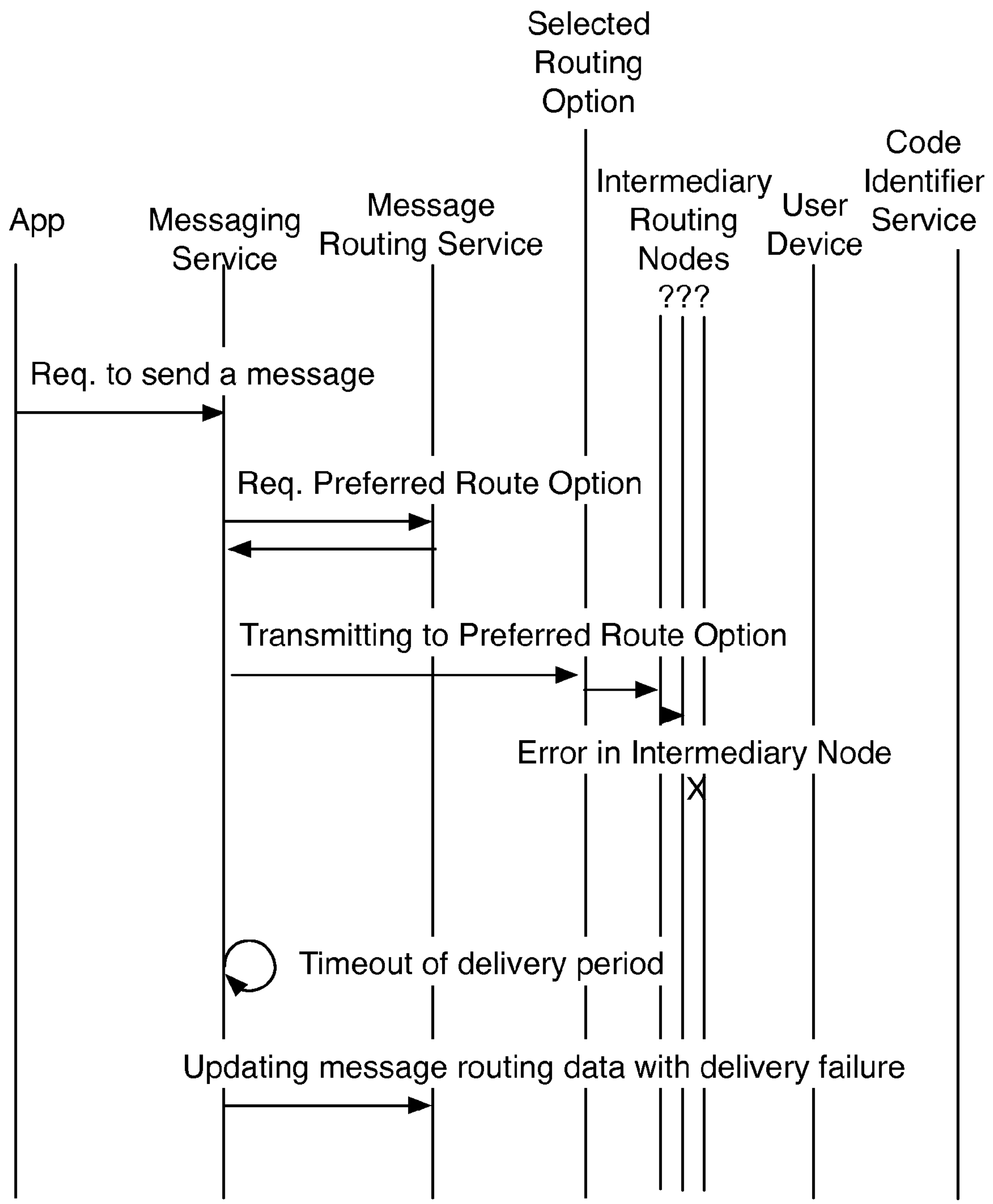
Figure 15:
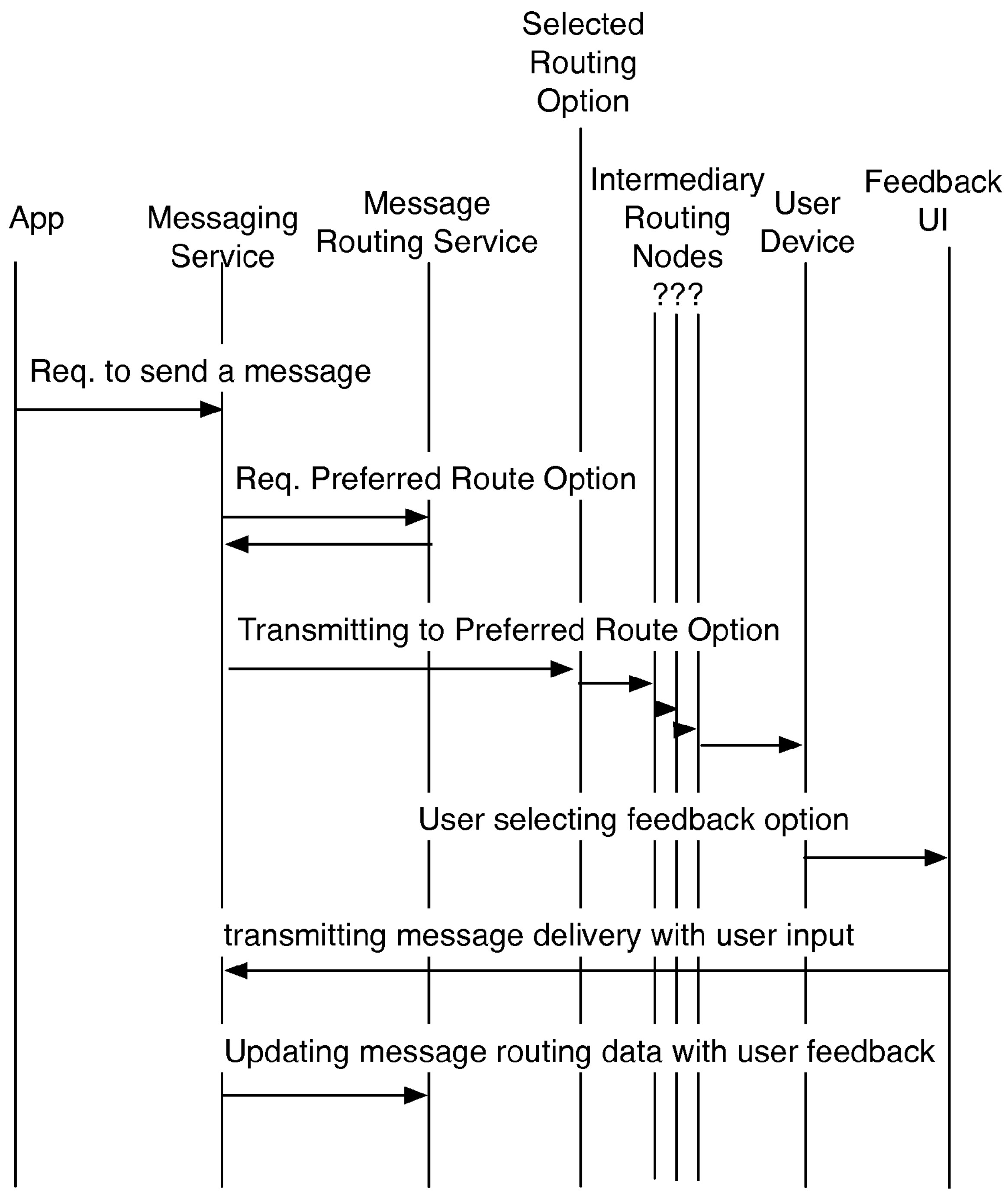
FIG. 15 is a communication flowchart of a scenario of message delivery report collected through a user feedback interface.
Figure 16:
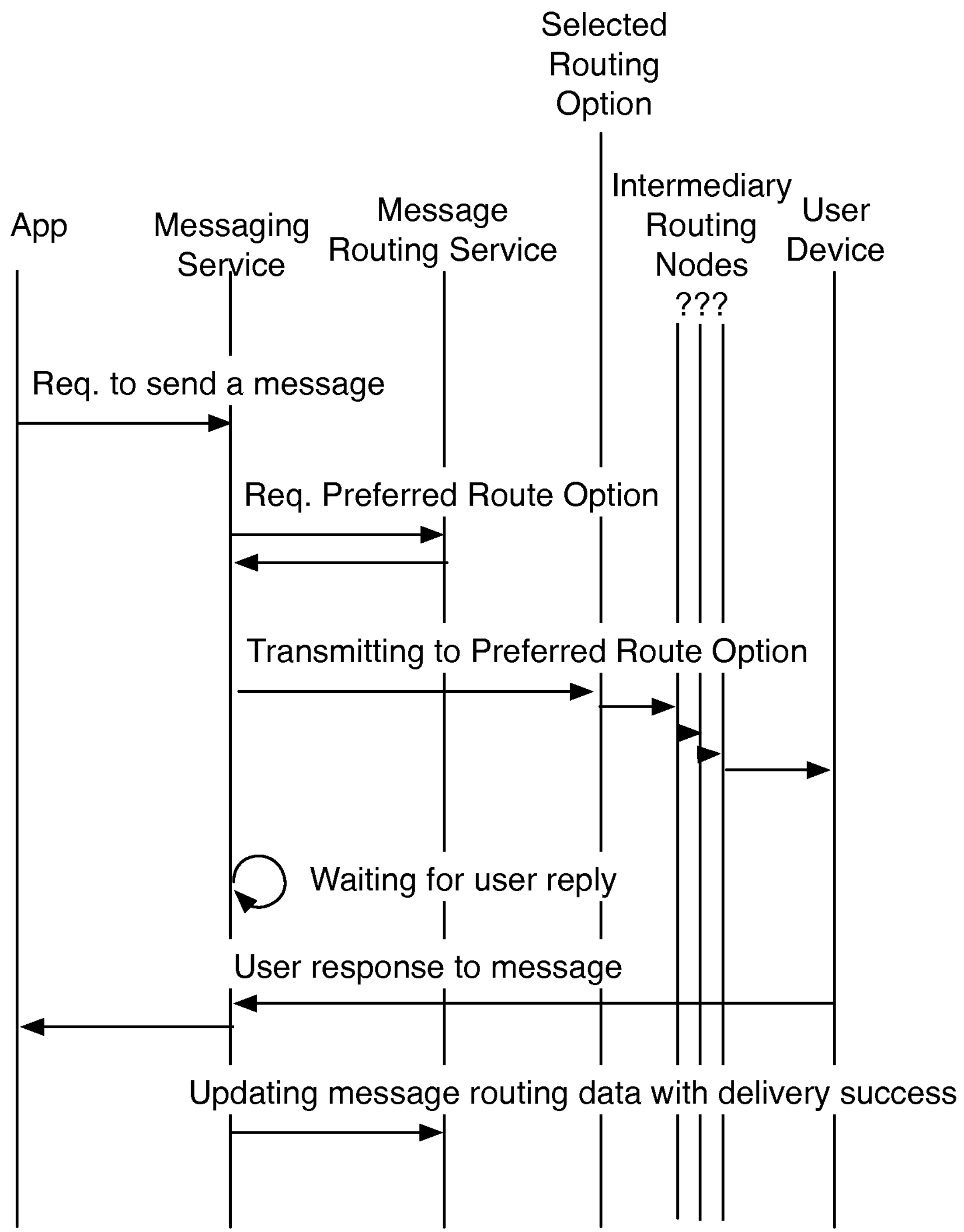
FIGS. 16 and 17 are communication flowcharts of scenarios of a coded identifier implementation.
Figure 17:
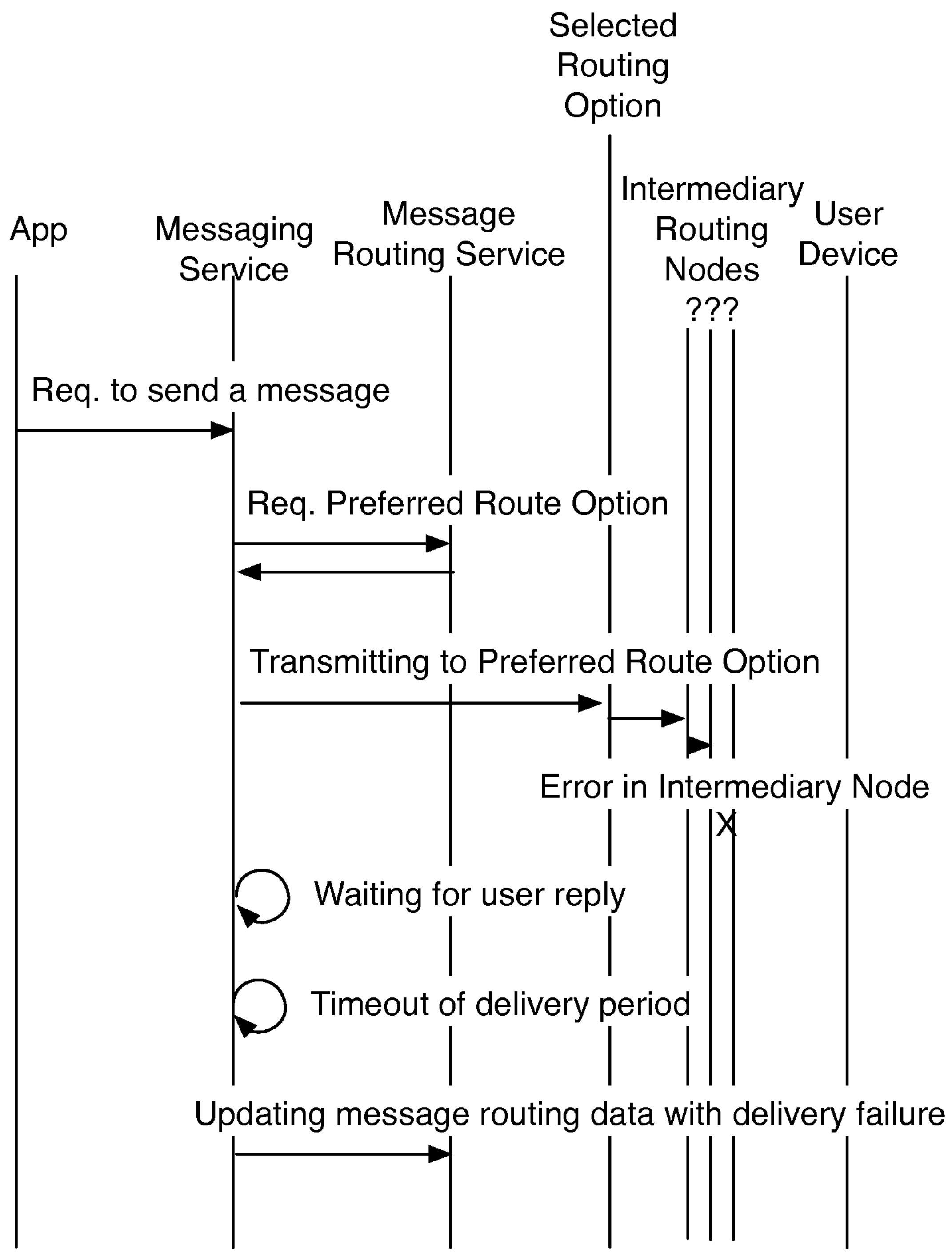

The above methods are preferably implemented continuously on at least a sub-set of messages that are transmitted by a communication platform. In one variation, not all messages provide delivery reports, but at least a sub-set does provide delivery reports. For example, the messaging service may enable developers to programmatically send messages for any suitable use-case. Of those, a subset may share links or send pin codes. This subset of use-cases can preferably provide routing data to inform the routing of other messages. When implemented on a multitenant communication platform this can be particularly beneficial to the various entities using the platform. Some use-cases may not have the necessary message volume or coverage to generate enough data. Or a use case may not have a reasonable mechanism to obtain message delivery reports. When implemented across multiple accounts, the combined message delivery reports of multiple accounts can improve route option selection. Additionally, multiple techniques can be combined. For example, coded identifier service can be used to contribute message delivery successes and failures (as shown in FIGS. 13 and 14), a user interface can be used to obtain user feedback on the quality of the message (as shown in FIG. 15), user response monitoring can detect other forms of message delivery success and failure (as shown in FIGS. 16 and 17), and/or any suitable variations of the above methods can be cooperatively used.

The above methods are preferably implemented by a system that includes telephony message service, a routing option database, and at least an interface to communication of a second channel. The telephony message service is preferably used in transmission of messages. As described above, the messages are preferably SMS or MMS, but can be any suitable type of message. The telephony message is preferably enabled for programmatic transmission of messages. The telephony messages may be sent based on API requests or from application instructions. The telephony message service is preferably a multitenant service. Multiple users and multiple account holders (e.g., application developers) are preferably used to facilitate collection of delivery receipt confirmation. When the above methods are implemented across multiple accounts and with multiple users, the routing options (even a set of routing options covering various global regions) can be simply checked and monitored. The routing option database preferably stores any routing option data and information to establish communication with a routing option service/carrier entity. A routing service may provide an interface in front of the routing option database. The service can be used to easily determine what routing option should be used. Similarly, the interface may simplify the act of providing new message delivery report data.

An alternative embodiment preferably implements the above methods in a computer-readable medium storing computer-readable instructions. The instructions are preferably executed by computer-executable components preferably integrated with a message router. The message router is preferably part of a telephony platform and may additionally be coupled with a feedback interface, a link redirector, pin code API, or any suitable component to facilitate message delivery feedback. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

What is claimed is:

1. A method for transmitting telephony messages comprising:

transmitting a first outgoing telephony message through a first channel using a first routing option selected from a plurality of routing options;

receiving a message delivery report through at least a second channel, wherein the second channel is different from the first channel;

updating message routing data in response to the message delivery report;

selecting a second routing option for at least a second outgoing message, the second routing option selected from the plurality of routing options prioritized by the updated message routing data; and transmitting the second outgoing telephony message through the first channel using the selected second routing option.

2. The method of claim 1, wherein the first channel is a short message service (SMS) message communication channel.

3. The method of claim 1, wherein the first channel is a multimedia messaging service (MMS) message communication channel.

4. The method of claim 1, wherein the plurality of routing options includes a set of message delivery gateway destinations, wherein at least a subset of the message delivery gateway destinations are different carriers.

5. The method of claim 1, wherein updating message routing data in response to the message delivery report comprises ranking routing options based on delivery success rates as indicated by a message delivery report.

6. The method of claim 1, further comprising classifying a message as undelivered if the message delivery report is not received within a timeout period.

7. The method of claim 1, wherein the second channel is internet protocol network.

8. The method of claim 1, wherein receiving a message delivery report comprises receiving the message delivery report through an application programming interface (API) of the messaging platform from at outside application.

9. The method of claim 8, wherein a message delivery report indicates a message quality report collected through a user interface on the destination device.

10. The method of claim 1, further comprising providing a link redirection service; converting a link within content of the first telephony message to a redirection link directed at the link redirection service; wherein receiving a message delivery report through at least a second channel comprises receiving confirmation that the link of the first telephony message was accessed.

11. The method of claim 1, further comprising providing a pin code validation service; wherein the first telephony message includes a pin code generated by the pin code validation service; and wherein receiving a message delivery report through at least a second channel comprises receiving confirmation that the generated pin code was validated by a device.

12. The method of claim 1, wherein receiving a message delivery report through at least a second channel comprises monitoring user response inbound messages from the destination of the first message; and marking a message as received if a response is made within a timeout, otherwise marking a message as a delivery failure.

13. The method of claim 1, further comprising:

classifying the first outgoing telephony message into a first classification;

wherein updating message routing data comprises updating message routing data associated with the first classification; and classifying the second outgoing telephony message into the first classification.

14. The method of claim 13, wherein classifying a first outgoing telephony message and classifying the second outgoing telephony message comprises analyzing a message properties of at least a destination address, content properties, message cost, and time of day.

15. The method of claim 1, further comprising prior to transmitting the second outgoing telephony message, modifying the second telephony message.

16. The method of claim 15, wherein modifying the second telephony message includes selectively changing encoding of the content of the second telephony message, splitting the content into multiple messages that are individually transmitted, or editing content of the second telephony message.

17. The message of claim 1, further comprising upon receiving a message delivery report exposing a confirmation of message delivery through an application programming interface (API).

18. A method comprising:

providing a message delivery system with at least two message delivery channel options;

sending a message through the message delivery system with a coded identifier in the content of the message, the message sent through one of the message delivery channel options, and wherein the coded identifier is mapped to the message delivery channel option used in sending the message;

at a code identifier service, tracking use of the coded identifier;

in response to the tracked use of the coded identifier, generating a score of the message delivery channel option based on results of the tracked message delivery.

19. The method of claim 18, wherein the coded identifier service is a two-factor authentication service; wherein sending a message through the message delivery system is initiated by the two-factor authentication service and the content is a pin code; wherein tracking use of the coded identifier comprises confirming a pin code during authentication and using pin code validation as confirmation of message delivery.

20. The method of claim 18, wherein the coded identifier is a redirection universal resource identifier (redirection-URI), wherein tracking use of the coded identifier comprises detecting access of the redirection-URI as confirmation of message delivery.

21. The method of claim 20, further comprising providing a link shortening service; and converting links in content of a message to redirection-URIs.

22. The method of claim 18, further comprising selecting a message delivery channel option based on the score of the message delivery channels when transmitting a subsequent message delivery.

23. The method of claim 22, further comprising determining a classification of the message; and wherein selecting a message delivery channel option based on the score of the message delivery channels comprises selecting a message delivery channel option based on the score of the message delivery channels when transmitting a subsequent message delivery of the same classification.

* * * * *